May 14, 1957 R. J. HERBOLD 2,792,516
PHOTOSENSITIVE ELECTRON EMISSION CELL
Original Filed June 21, 1952

INVENTOR
ROBERT J. HERBOLD
BY
ATTORNEY

United States Patent Office 2,792,516
Patented May 14, 1957

2,792,516

PHOTOSENSITIVE ELECTRON EMISSION CELL

Robert J. Herbold, Denver, Colo.

Original application June 21, 1952, Serial No. 294,941. Divided and this application May 28, 1953, Serial No. 363,834

1 Claim. (Cl. 313—96)

This invention relates to a photosensitive electron emission cell which serves in electronic apparatus for stabilizing the attitude of moving craft and instruments carried thereby.

Various problems are involved in stabilizing a craft during its normal travel or in stabilizing a support for apparatus mounted on a rolling or pitching boat or aircraft. The stabilization of a moving body requires an invariable reference plane or direction of energy or other constant uni-directional medium with reference to which the position of the craft may be compared. The direction of terrestrial electromagnetic lines of force which affect a compass varies for different locations on the earth and does not provide a satisfactory reference for some conditions. Gravity is uni-directional, but at the high speeds now feasible for craft flight, the action of gravity alone is insufficient for a reference. Also, gyroscopes and related instruments require complex structural features to compensate for variable conditions, but these are affected by the extremely high speeds that are now feasible. It is desirable to have a horizontal or other plane which may serve as a reference for various instruments.

I propose to employ an electronic device for determining or controlling an instrument or craft attitude, but this depends upon the provision of an invariable plane for the reference. For that reference, I use the earth horizon or the horizontal plane that is perpendicular to an earth radius at the point of location of the craft.

The primary object of my invention is accordingly to provide a photosensitive electron emission cell for use in electronic apparatus which employs the horizon as a reference plane and which has photo emissive cathodes and anodes arranged to scan all quadrants of the horizon, and wherein the activation of the cathodes depends upon the angularity of the light rays impinging thereon. Further objects will be apparent in the following disclosure.

The electronic apparatus in which my tube is used is described and claimed in my copending application, Serial No. 294,941, filed June 21, 1952. The operation of that electronic scanning device, which views the earth horizon and electrically responds or indicates when a horizontal plane is maintained with reference thereto, is based on the fact that when an aircraft is at a sufficiently high altitude, the earth horizon provides a substantially horizontal reference plane perpendicular to the earth axis at that point, irrespective of mountains and other surface irregularities. Similarly, the horizon of the ocean appears to be substantially in a horizontal plane when viewed from a high point on a boat. Light from the sky may be employed to activate the photo sensitive element of the cell herein claimed which is in a condition of saturation for a minimum light intensity, and that cell will respond according to whether its activation is caused by the greater light from the sky or from the lesser earth light. Hence, if the cell is tilted toward the sky, it gives a larger output than when it scans the earth. The electronic system is such that it is balanced for the variable ambient light and therefore responds only to a variation in the ratio of the sky and earth lights as is caused by a tilting of the craft. This differential activation which distinguishes between earth and sky light is provided by so shadowing the photosensitive element that any tilting of the cell varies its area of activation and therefore the cell output. My device is so constructed that the electronic activation is proportional only to the photosensitive area illuminated.

Referring to the drawings which diagrammatically illustrate an embodiment of this invention:

Figure 1:
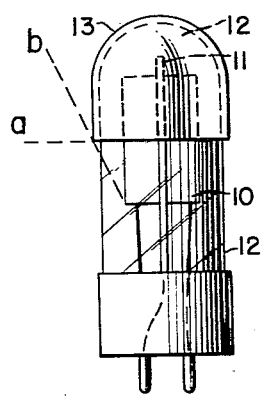
Fig. 1 is a front view of a shielded phototube held vertically and with the upper half of the cathode in the shadow of the shield.
Figure 2:
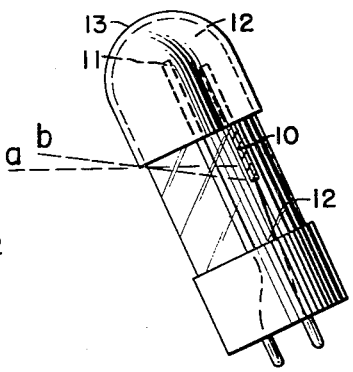
Fig. 2 is a side view of the tube tilted towards the left, with all of the cathodes shadowed.
Figure 3:
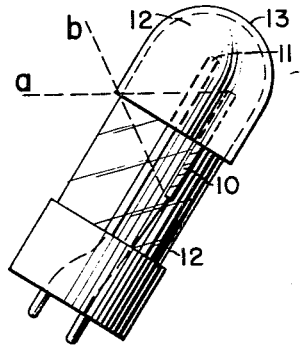
Fig. 3 is a similar view showing the entire surface of the cathode lighted when the tube is tilted to the right.

A photocell of the type shown in Figs. 1 to 3 is described in my Patent #2,489,222 of November 22, 1949. It comprises a cathode having a light sensitive surface which has its area of activation varied in accordance with the directive angularity of light passing the edge of a shield extending to a medial point on the cathode and arranged to shadow a variable portion of the cathode surface as the light angle changes. This cell may be so arranged that it will scan the horizon and differentiate electronically between the sky and earth lights. The photosensitive electron emissive tube of Figs. 1, 2 and 3 may comprise a cathode 10, whether a plate or a wire, having a coating of a suitable light sensitive material and an anode 11 mounted within a cylindrical, transparent glass tube 12. The upper half of the glass tube is enveloped by a shield 13 made of a suitable opaque material or a semi-translucent shield which will not pass or restrict certain wave lengths of light, and particularly the infrared. As shown in Fig. 1, the shield is so located that when the tube is vertical, a horizontal ray of light represented by the dotted line $a$ just passing the lower circular horizontal edge of the shield bisects the cathode 10. This line $a$ may therefore represent the horizon, and any light from the darker earth that strikes the upper part of the cathode obviously has a lesser actinic value than has the light passing to the cathode through the triangle between the horizon line $a$ and the line $b$ which just clears the edge of the shield and strikes the bottom edge of the cathode. That is, the bottom half of the cathode may be activated by rays of light coming from above the horizon but bounded by the oblique line $b$. It is to be understood that suitable shields will eliminate other extraneous light rays. If the tube is tipped towards the left, as shown in Fig. 2, the angle between the lines $a$ and $b$ representing the angle at which light may strike the cathode becomes smaller so that when the lines $a$ and $b$ coincide the cathode is not illuminated or activated. If the tube is tipped towards the right, as shown in Fig. 3, then that angle becomes larger and in an ultimate position of tilt the cathode is fully illuminated. This applies to the various photosensitive cells, whether they are of the voltaic, the resistance, or photoconductive, or the electron emissive types, and each type may be used in my system with suitable wiring modifications. A photoconductive cell may comprise a resistance wire of selenium or other metal which has its conductivity varied by light. A photovoltaic cell may comprise copper oxide in a suitable electricity generating system which has its activity varied by light. I prefer to use one of the various electron emissive tubes, as herein described.

The compound photocell of the present invention has a plurality of cathodes and anodes, where each scans a definite angular portion of the horizon and thus is activated in accordance with the tilt of the photocell and the corresponding angularity of the light which passes the shield onto the cathode. In order that variations in light conditions, such as are found when the craft is within a heavy cloud, may not affect the control apparatus, I employ a pair of balanced tubes for each sector of the horizon. The balanced tubes may be similar in their characteristics and arranged to receive the same directional light, except that the shield is omitted from one so that it is affected by the ambient light at all times. These two tubes are so arranged in a balanced bridge circuit that any variation in light intensity will affect each of the tubes equally and thus counteract such variation.

Figure 4:
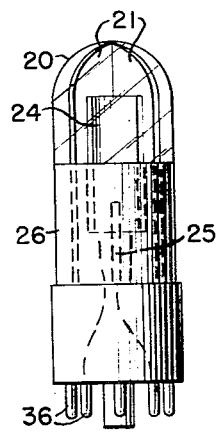
Fig. 4 is a vertical view of a compound phototube having a separate cathode and anode pair in each of four vertical quadrants.
Figure 5:
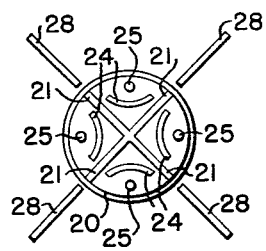
Fig. 5 is a top plan view of the compound tube and showing inner and outer screens dividing the quadrants.
Figure 6:
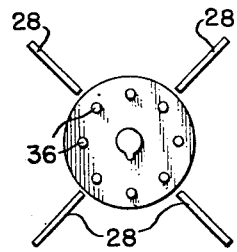
Fig. 6 is a plan view of the bottom of the tube.

The four shielded tubes are consolidated in a compound construction, as shown in Figs. 4, 5 and 6. This comprises a glass or other translucent, substantially cylindrical tube 20 having four opaque partitions 21 arranged diametrically and vertically therein and shaped to divide the inner cylindrical space into four vertical quadrants. These partitions may be made of metal, plastic or other material that will not transmit the activating rays of light from one compartment to another. Mouned at the rear in each wide angled quadrant is a cathode 24 having its active surface facing outwardly, and in front is an anode 25. These are suitably positioned and shaped to satisfy the requirements of the invention. The cathode may be a flat plate activated on its front exposed face, as shown in Fig. 1, and the anode may be a centrally located metal rod or a rectangular metal frame. The cathode may be made of a set of coated wires mounted on a rectangular frame, as described in my copending application Serial No. 228,267 filed May 25, 1951. In that construction, the cathode comprises a rectangular nickel or other metal wire frame carrying a set of parallel wires of nickel coated with silver and sensitized by means of a coating of caesium metal on a base of oxidized caesium laid on the silver, which is so treated as to provide a surface that is sensitive to or activated by infrared light in particular.

The outside of the glass wall 20 is provided with a shield 26, like the shield 13, which is adapted to cut off the infra red rays of light that would activate the cathode. The shield is arranged to protect or shield half of the cathode from a horizontal ray. The shield 26 may be formed by coating the outer surface of the glass with a suitable gelatin, such as corresponds with a Wratten gelatin filter #64, 65 or 67, which transmits light other than red and infrared. Such a shield permits activation of all of the cathode surface by embient light but shadows it only for the red and infrared rays, or other rays selected for the purpose. Since the earth is a source of infrared rays it is desirable to shield the cathode from such wave lengths. This screen may also be made of a film of cellulose acetate or nitrate applied on the outside of the glass to the required thickness to shield the cathode. The translucence of this film may be controlled by adding opaque powders or dyes, such as by incorporating a small amount of dispersed graphite or a dye in a nitrocellulose solution before it is applied to the glass surface. This shield may also be made of an entirely opaque material to shut off all light rays from the cathode areas shadowed thereby. Infrared rays travel in straight lines and there is little or no ambient infrared light in the air which would affect the operation of the device. Instead of coating the glass, a cap or band of suitable material may be shaped and fitted over the outside of the tube. Various other expedients may be employed. In order to protect each cathode from light coming from another quadrant, I may also provide an outside shield comprising four vertical partitions 28 arranged at right angles to serve as continuations of the inner partitions 21, and these may be suitably mounted for the purpose.

Mounted within the same quadrant defined by each adjacent pair of outer partitions 28 is a second balancing tube which has the same electronic characteristics as the one provided with the shield 26. This balancing tube may be a compound tube like that shown in Figs. 4, 5 and 6 and have identical characteristics except for the absence of the shield 26. In that case, only two of the compound tubes are required in the system.

These tubes may be suitably mounted on the craft where they may scan the horizon and some of the sky light. For example, the fuselage of the craft may carry a suitable downwardly projecting bay formed of transparent material capable of passing all of the required actinic rays. The pair of balanced tubes may be suitably mounted where they project downwardly from an opaque wall and in that case the shield 26 will be at the bottom of the tube as shown in Fig. 4 and so will extend from the top base plug downwardly half way across the cathode. The compound tubes (Fig. 4) scan in all directions and only two are needed, one mounted vertically above the other. The base of the multiple cathode tube of Fig. 4 may be provided with a suitable number of prongs 36 that are connected properly with the respective cathodes and anodes in each quadrant, and these prongs will be connected into the electrical circuits as needed. Various constructional details may be employed in the structure and mounting of these tubes, as well as the shields and the light confining walls.

Any unbalanced condition represented by tilting the cathodes of each two corresponding cell quadrants facing in a given direction can be employed to actuate a control mechanism governing the position of the cathode relative to a vertical line. For example, an electronic circuit, which is normally balanced when the two opposed seats of cells are vertical or at a desired angle, may be employed to control a servomotor which in turn governs or actuates mechanism that controls the position of the photocells. The four photocell quadrants of Fig. 5 are connected electrically in two separate circuits, having oppositely facing cells in each circuit. That is, cells facing north and south, for example, will be in one circuit, and the east, west cells in the other. These two circuits are electrically alike. As one system which operates to this end, and as described in said copending application a reversible motor which controls the ailerons or elevators of an aircraft may have its field or armature current varied in accordance with the directive angle illumination and activation of the cathodes, as indicated by the response of the unbalanced circuit, to cause the motor to so adjust the positions of the ailerons or elevators as to bring the craft, or a platform carrying various instruments, back to a normal horizontal position. Opposite cathodes of each cell scan the horizon in opposite directions lateral of the craft and thus control the lateral variation from a horizontal, while the other opposite cathodes scan the horizon to the front and rear or at right angles to the first pair to control the pitch or forward tilt of the craft.

Each cathode of the shielded cell is so shielded by walls and partitions that its activation is dependent of the angular tilt of the cell relative to the horizon. That is, each cathode is so shielded that its activation is varied in accordance with whether the major light received by it is derived from the sky or is reflected earth light. Thus, the horizon forms a boundary line which is indirectly caused to shadow the photosensitive element to a varying extent. Consequently, that element, which may be balanced for a given horizon shadow effect, will have its electrical output varied in accordance with the cell activation.

Various modifications will be readily apparent to one skilled in the art. Hence, the above description of preferred embodiments is to be interpreted as defining and illustrating the principles of my invention and not as imposing limitations on the appended claim.

This case is a division of my copending application, Serial No. 294,941, filed June 21, 1952.

I claim:

A photosensitive electron emission cell comprising a transparent substantially cylindrical tube arranged for receiving light throughout the 360° angle about the tube axis, light restricting partitions arranged substantially radially of the tube axis which form separate compartments facing only outwardly between radial planes, a photosensitive cathode in each compartment independent of the partitions which has its light sensitive surface facing outwardly, a separate anode associated with each cathode, a separate pair of terminals connected respectively with the cathode and anode in each compartment, said partitions and cathodes being so shaped and arranged that the scanning field of each cathode is confined by and between the adjacent partitions and without substantial overlapping of the fields of adjacent cathodes, the cathodes scanning substantially the entire circumference within a limited vertical angle when the axis of the cell is vertical, and a light restricting shield associated with and having an edge intermediate of each cathode arranged to shadow the cathode vertically and provides an area of activation thereof which varies with the directive angle of light rays relative to the edge of the shield.

References Cited in the file of this patent

UNITED STATES PATENTS

| | | |
|---|---|---|
| 2,001,685 | Law | May 14, 1935 |
| 2,166,672 | Baker | July 18, 1939 |
| 2,489,222 | Herbold | Nov. 22, 1949 |

FOREIGN PATENTS

| | | |
|---|---|---|
| 906,557 | France | May 22, 1945 |